US011004571B2

(12) United States Patent
Bondre et al.

(10) Patent No.: US 11,004,571 B2
(45) Date of Patent: May 11, 2021

(54) MODULAR BASKET ASSEMBLY FOR FUEL ASSEMBLIES

(71) Applicant: TN Americas LLC, Columbia, MD (US)

(72) Inventors: Jayant R. Bondre, Clarksville, MD (US); Ernesto Cruz Villaflores, Laurel, MD (US)

(73) Assignee: TN Americas LLC, Columbia, MD (US)

(*) Notice: Subject to any disclaimer, the term of this patent is extended or adjusted under 35 U.S.C. 154(b) by 225 days.

(21) Appl. No.: 16/227,454

(22) Filed: Dec. 20, 2018

(65) Prior Publication Data
US 2019/0189295 A1 Jun. 20, 2019

Related U.S. Application Data

(60) Provisional application No. 62/608,526, filed on Dec. 20, 2017.

(51) Int. Cl.
G21F 5/012 (2006.01)
G21F 5/06 (2006.01)
(Continued)

(52) U.S. Cl.
CPC ............ *G21F 5/012* (2013.01); *G21F 5/06* (2013.01); *G21C 3/328* (2013.01); *G21C 3/334* (2013.01); *G21C 3/336* (2013.01); *G21C 3/3408* (2013.01)

(58) Field of Classification Search
CPC ... G21F 5/012; G21F 5/06; G21F 5/00; G21F 5/005; G21F 5/008; G21F 5/015;
(Continued)

(56) References Cited

U.S. PATENT DOCUMENTS 4,680,159 A 7/1987 Lahr et al.
4,770,844 A 9/1988 Davis, Jr.
(Continued)

FOREIGN PATENT DOCUMENTS

DE 3 933 530 A1 4/1991
EP 0 735 543 B1 5/2000
(Continued)

OTHER PUBLICATIONS

Gulf Cooperation Council Examination Report dated Apr. 18, 2020, issued in corresponding GC Application No. 2018-36689, filed Dec. 18, 2018, 4 pages.
(Continued)

*Primary Examiner* — Darlene M Ritchie
(74) *Attorney, Agent, or Firm* — Christensen O'Connor Johnson Kindness, PLLC

(57) ABSTRACT

A basket assembly for receiving a plurality of fuel assemblies includes a basket having a grid defining spacing between fuel assembly compartments, the grid defining a first compartment for receiving a first fuel assembly and a second compartment for receiving a second fuel assembly, wherein the cross-sectional area of the second compartment is larger than the cross-sectional area of the first compartment. The basket assembly is configured to receive in the first compartment a first fuel assembly, the first fuel assembly being a regular fuel assembly, and the basket assembly configured to receive in the second compartment a second fuel assembly, the second fuel assembly being an irregular fuel assembly, wherein the irregular fuel assembly includes at least one irregular fuel rod.

17 Claims, 7 Drawing Sheets

(51) Int. Cl.
*G21C 3/328* (2006.01)
*G21C 3/336* (2006.01)
*G21C 3/34* (2006.01)
*G21C 3/334* (2006.01)

(58) Field of Classification Search
CPC ...... G21C 3/328; G21C 3/336; G21C 3/3408;
G21C 3/334; G21C 3/356; G21C 19/07;
G21C 19/02; G21C 19/06; Y02E 30/30
USPC .......................................................... 376/272
See application file for complete search history.

(56) References Cited

U.S. PATENT DOCUMENTS

| | | | |
|---|---|---|---|
| 4,908,515 A | 3/1990 | McLeod | |
| 5,434,898 A | 7/1995 | Barkhurst | |
| 5,572,560 A * | 11/1996 | Brown | G21C 3/328 |
| | | | 376/435 |
| 5,633,904 A | 5/1997 | Gilligan, III et al. | |
| 5,992,634 A * | 11/1999 | Woodring | B65D 5/48024 |
| | | | 206/524.3 |
| 5,995,573 A | 11/1999 | Murray, Jr. | |
| 7,961,834 B2 | 6/2011 | Andre et al. | |
| 8,416,912 B2 | 4/2013 | Gentet et al. | |
| 8,929,504 B2 | 1/2015 | Singh et al. | |
| 9,443,626 B2 | 9/2016 | Bracey et al. | |
| 9,558,857 B2 | 1/2017 | Subiry | |
| 10,854,346 B2 * | 12/2020 | Singh | G21C 19/07 |
| 2010/0191615 A1 * | 7/2010 | Thomas | G06Q 30/0601 |
| | | | 705/26.1 |
| 2010/0208862 A1 * | 8/2010 | Lorenzo | G21C 3/36 |
| | | | 376/432 |
| 2011/0311016 A1 * | 12/2011 | Bashkirtsev | G21C 3/60 |
| | | | 376/438 |
| 2014/0137986 A1 | 5/2014 | Moricca et al. | |
| 2015/0170766 A1 | 6/2015 | Singh et al. | |
| 2015/0221402 A1 | 8/2015 | Singh | |
| 2016/0012926 A1 | 1/2016 | Lehnert et al. | |
| 2017/0229199 A1 | 8/2017 | Delage et al. | |
| 2018/0247720 A1 * | 8/2018 | Singh | G21C 19/07 |

FOREIGN PATENT DOCUMENTS

| | | | | |
|---|---|---|---|---|
| GB | 2200789 A * | 8/1988 | | G21C 19/36 |
| JP | 7-287088 A | 10/1995 | | |
| JP | 3605171 B2 | 10/2004 | | |

OTHER PUBLICATIONS

International Search Report and Written Opinion dated Apr. 24, 2019, issued in corresponding International Application No. PCT/US2018/066784, filed Dec. 20, 2018, 12 pages.

* cited by examiner

MODULAR BASKET ASSEMBLY FOR FUEL ASSEMBLIES

CROSS-REFERENCE TO RELATED APPLICATION

This application claims the benefit of U.S. Provisional Application No. 62/608,526, filed Dec. 20, 2017, the disclosure of which is hereby expressly incorporated by reference herein in its entirety.

BACKGROUND

Canister assemblies are typically used for storing and transporting radioactive fuel. Canister assemblies for spent fuel include "baskets" for receiving individual fuel assemblies in the cells of the basket, with the basket and the fuel assemblies being contained within the outer canister. Baskets are typically constructed from stainless steel plates or neutron absorber plates that can also perform the same structural function as stainless steel plates and aluminum rails or other steel structure that are either welded or stacked into a basket configuration. Geometric spacing and fixed neutron absorbers between compartments are used to maintain criticality control. There exists a need for an improved modular basket designs, particularly for irregular fuel assemblies. Embodiments of the present disclosure are directed to fulfilling these and other needs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a basket assembly for receiving a plurality of fuel assemblies is provided. The basket assembly includes a basket having a grid defining spacing between fuel assembly compartments, the grid defining a first compartment for receiving a first fuel assembly and a second compartment for receiving a second fuel assembly, wherein the cross-sectional area of the second compartment is larger than the cross-sectional area of the first compartment, the basket assembly configured to receive in the first compartment a first fuel assembly, the first fuel assembly being a regular fuel assembly, and the basket assembly configured to receive in the second compartment a second fuel assembly, the second fuel assembly being an irregular fuel assembly, wherein the irregular fuel assembly includes at least one irregular fuel rod.

In accordance with another embodiment of the present disclosure, a basket assembly for receiving a plurality of fuel assemblies is provided. The basket assembly includes a basket having a grid defining spacing between fuel assembly compartments, the grid defining at least a first compartment configured for receiving a first fuel assembly, wherein the first fuel assembly is a regular fuel assembly, and a second compartment configured for receiving a second fuel assembly, wherein the second fuel assembly is an irregular fuel assembly, and wherein the cross-sectional area of the second compartment is larger than the cross-sectional area of the first compartment by a multiplication factor.

In accordance with another embodiment of the present disclosure, a basket assembly including a plurality of fuel assemblies is provided. The basket assembly includes a basket having a grid defining spacing between fuel assembly compartments, the grid defining at least a first compartment and a second compartment, wherein the cross-sectional area of the second compartment is larger than the cross-sectional area of the first compartment, and a first regular fuel assembly disposed in the first compartment and a second irregular fuel assembly disposed in the second compartment.

In any of the embodiments described herein, the irregular fuel rod may be selected from the group consisting of a bowed fuel rod, a twisted fuel rod, a deformed fuel rod, a damaged fuel rod, bottled fuel debris, and any combinations thereof.

In any of the embodiments described herein, the cross-sectional area of the second compartment may be larger than the first compartment by a multiplication factor.

In any of the embodiments described herein, the second compartment may have the same cross-sectional shape as the first compartment.

In any of the embodiments described herein, the grid may define a plurality of first compartments.

In any of the embodiments described herein, the grid may define a plurality of second compartments.

In any of the embodiments described herein, the grid dimensions may be equivalent to a spacing of first compartments in a square array.

In any of the embodiments described herein, the cross-sectional shape of the first compartment may be square.

In any of the embodiments described herein, the cross-sectional shape of the second compartment may be square.

In any of the embodiments described herein, the first and second fuel assemblies may be spent fuel assemblies.

In any of the embodiments described herein, the basket assembly may further include a third compartment for receiving a third fuel assembly, wherein the cross-sectional area of the third compartment may be larger than the cross-sectional areas of the first and second compartments.

In any of the embodiments described herein, the cross-sectional area of the third compartment may be larger than the cross-sectional area of the first compartment by a multiplication factor.

In any of the embodiments described herein, the third compartment may have the same cross-sectional shape as the first and second compartments.

In any of the embodiments described herein, the cross-sectional shape of the third compartment may be square.

In any of the embodiments described herein, the grid may define a plurality of third compartments.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1A:
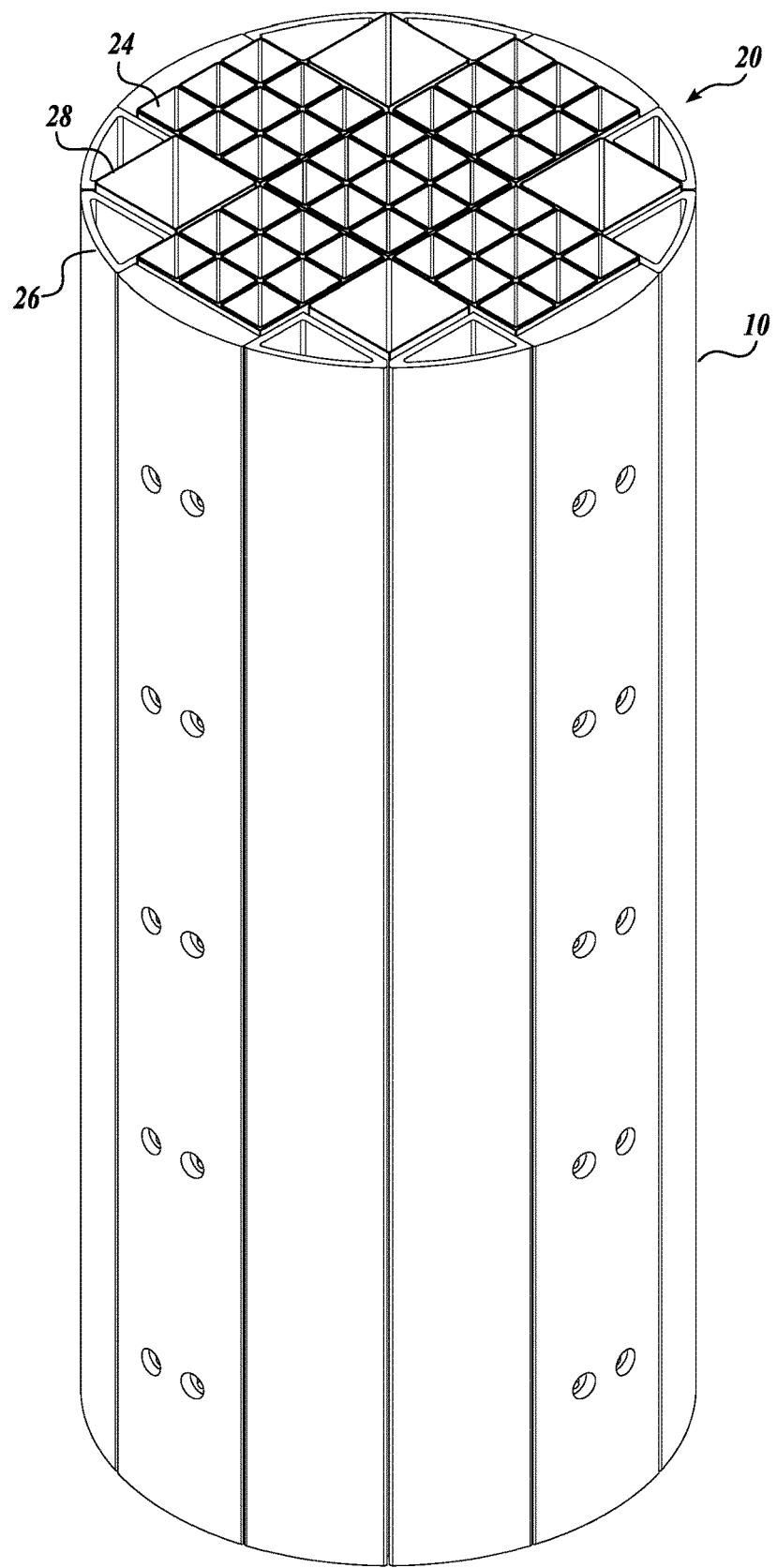
FIG. 1A is an isometric view of a basket assembly in accordance with one embodiment of the present disclosure.
Figure 1B:
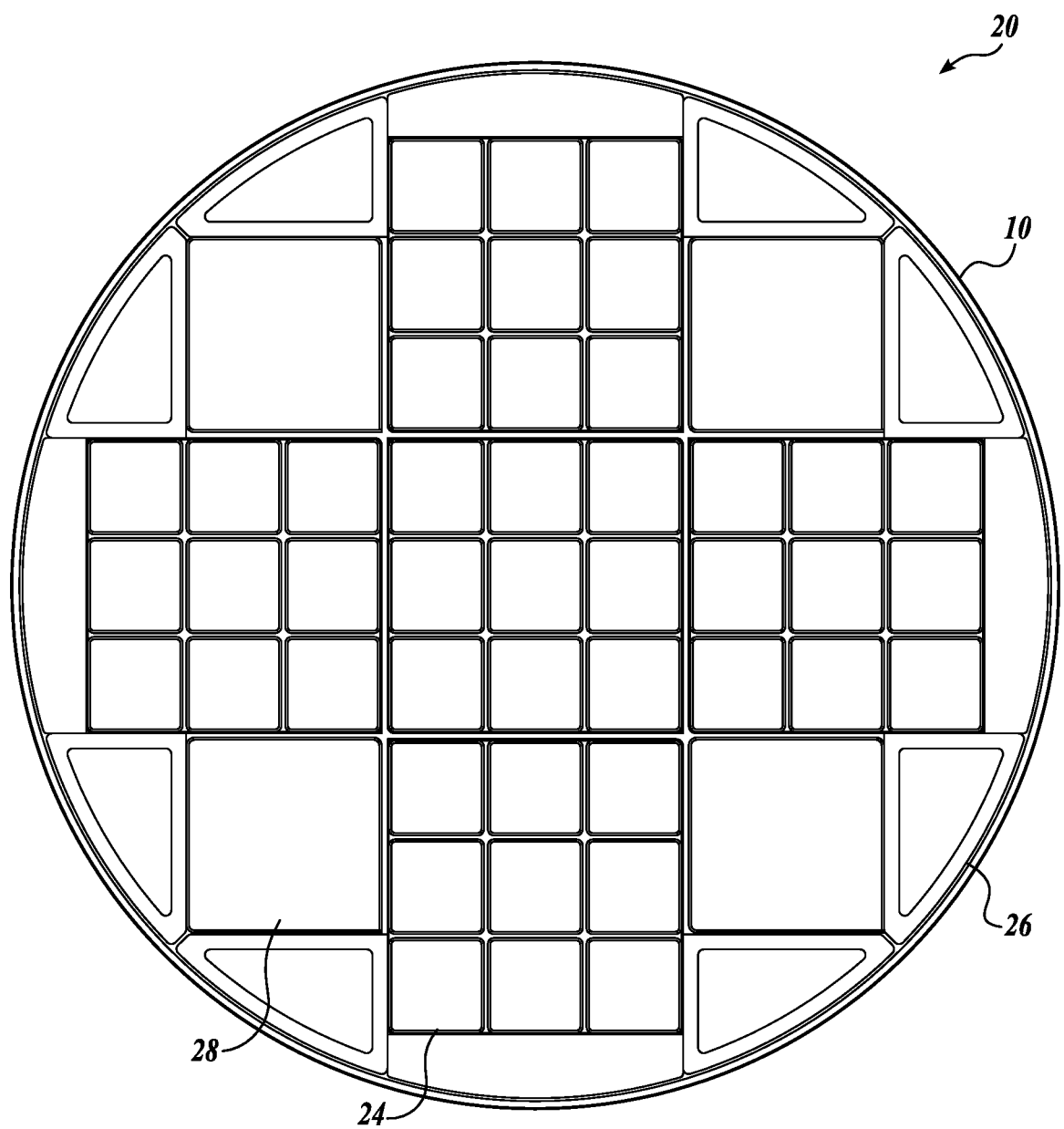
FIG. 1B is a top view of the basket assembly of FIG. 1A.

Embodiments of the present disclosure are directed to modular basket assemblies, for assemblies, for example, used for the dry storage, transportation and containment of radioactive materials in ventilated canister storage or transportation systems, and methods of manufacturing such basket assemblies. Referring to FIGS. 1A and 1B, a modular basket assembly 10 constructed in accordance with one embodiment of the present disclosure is provided. The modular basket assembly 10 includes a basket including a grid 20 (see FIG. 1B) defining a plurality of fuel assembly compartments 24. The grid 20 of compartments defines at least a first compartment 24 for receiving a first fuel assembly and a second compartment 28 for receiving a second fuel assembly.

In embodiments of the present disclosure, the cross-sectional areas of the first and second compartments 24 and 28 are non-uniform. In one embodiment, the cross-sectional area of the second compartment 28 is larger than the cross-sectional area of the first compartment 24.

The basket assembly of the present disclosure is configured to receive an irregular fuel assembly, which may include at least one irregular fuel rod, such as bowed fuel rod, a twisted fuel rod, a deformed fuel rod, a damaged fuel rod, bottled fuel debris, or any combinations thereof.

Nuclear fuel is a material that can be "burned" by nuclear fission or fusion to produce energy. For example, a fuel assembly may include an enriched uranium fuel (~4% of U-235) as a fresh fuel. During the fuel "burning" process, the content of the U-235 decreases and the content of plutonium increases (up to ~1% of Pu).

Typical nuclear reactors include pressurized water reactors (PWRs) and boiling water reactors (BWRs). In most reactor applications, uranium fuel is in the form of uranium dioxide, which is a black semiconducting solid with very low thermal conductivity and a very high melting point. The uranium dioxide may be pressed into pellets, which are then sintered into a solid. These pellets are then loaded and encapsulated within a fuel rod, which may be a tube made of, for example, zirconium alloys. The surface of the tube covering the pellets is called fuel cladding.

The collection of fuel rods or elements is called a fuel assembly. Fuel rods are the base elements of a fuel assembly.

Although generally manufactured as uniform fuel assemblies including uniform fuel rods, irregularities occur during the "burning" process. Therefore, an irregular spent (or irradiated) fuel assembly may include one or more irregular spent fuel rods.

Spend (or irradiated) nuclear fuel assemblies are removed from the reactor and stored in a spent fuel pool to shield the radiation and cool the fuel assemblies. Spent fuel is typically cooled for 1-10 years in the pool before transfer to dry cask storage. Transfer to dry cask storage includes either moving the entire fuel assembly as a whole or individually moving the fuel rods from the fuel assembly from the pool to a basket assembly, which is contained in a canister. The canister is then processed by drying etc., transferred in a transfer cask to dry cask storage on-site or transported off-site in a transportation cask.

Embodiments of the present disclosure are directed to basket assemblies configured to receive irregular fuel assemblies containing at least one irregular fuel rod. A basket assembly 10 in accordance with one embodiment of the present disclosure is designed and configured to receive an irregular fuel assembly. The basket assembly 10 is configured to receive and contain a first fuel assembly within the first compartment 24, wherein the first fuel assembly is regular (and not deformed), and a second fuel assembly within the second compartment 28, wherein the second fuel assembly is an irregular fuel assembly. Contoured rails 26 are formed around the grid 22 to provide for an overall cylindrical or somewhat cylindrical structure or other structure of the basket assembly 10.

Figure 4:
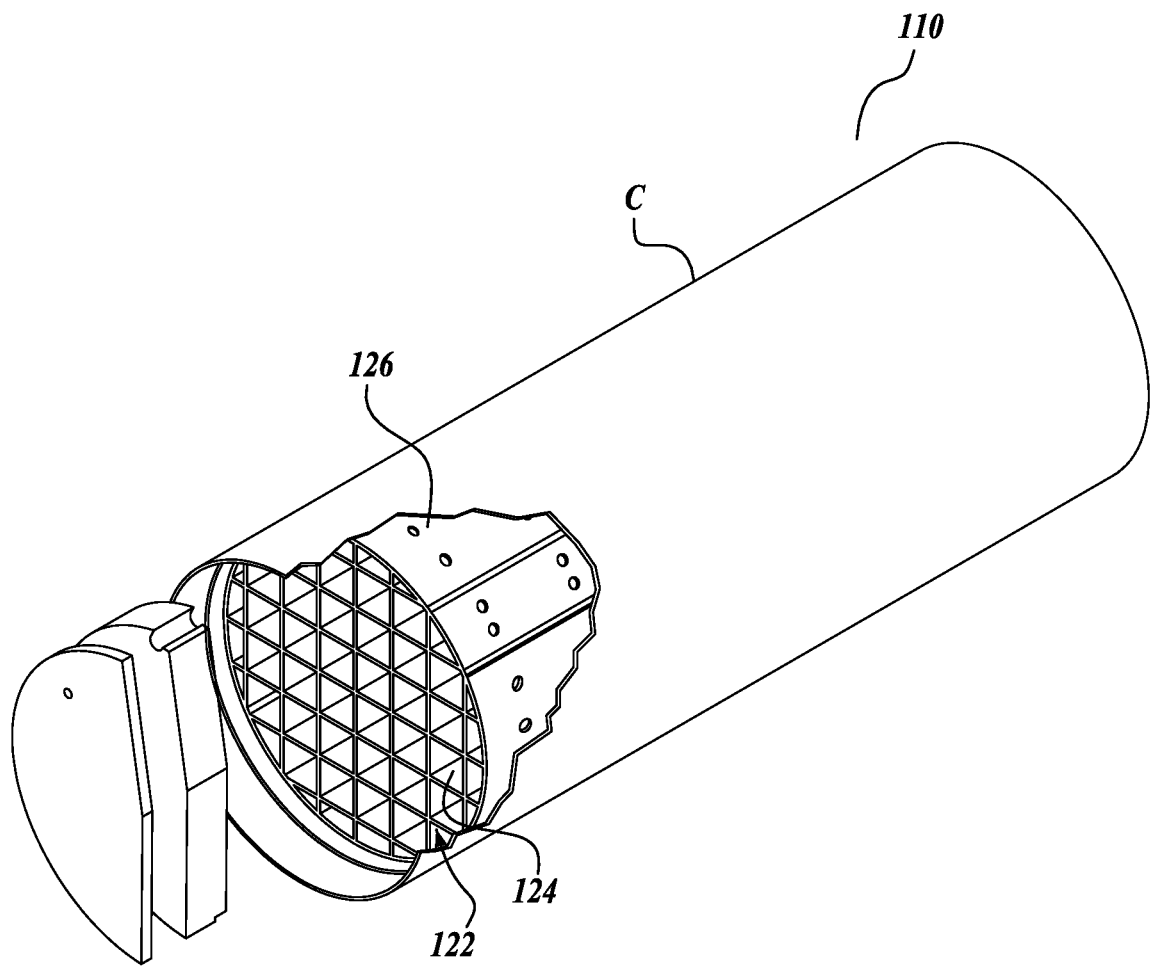
FIG. 4 is an isometric view of a basket assembly disposed within a canister assembly in accordance with previously developed technology.

Referring to FIG. 4, a previously designed basket assembly 110 for a container assembly C is shown. The basket assembly 110 generally defines a plurality of compartments or cells 124 in a uniform grid structure 122, wherein the cells 124 are constructed to be substantially uniform in cross-sectional dimensions. The cells 124 are configured for supporting individual fuel assemblies (not shown). Contoured rails 126 are formed around the grid structure 122 to provide for an overall cylindrical or somewhat cylindrical structure or other structure of the basket assembly 110. The grid structure 122 allows the fuel assemblies to maintain suitable geometric spacing between adjacent fuel assemblies to reduce the risk of criticality.

The individual cells 124 of the previously designed basket assembly 110 are typically manufactured from stainless steel plates or neutron absorber plates that can also perform the same structural function as stainless steel plates that are either welded or stacked together into a grid structure 122 defining the plurality of cells 124. Stainless steel plates are used for their structural properties and also because they are resistant to corrosion when used in a wet environment, such as a storage pool. Neutron absorber plates that can also perform the same structural function as stainless steel plates also are resistant to corrosion. Corrosion can result in structural degradation and/or contamination of the storage pool. The perimeter rails 126 are typically constructed from aluminum or steel. Neutron adsorbing plates (not shown) are configured to line the cells 124 of the grid structure 122, particularly between adjacent cells 124; therefore, the cells 124 form discrete and shielded longitudinal compartments for individual fuel assemblies.

In contrast with the uniform cell structure of the previously designed basket assembly 110 of FIG. 4, the cell structure of the basket assemblies 10 of the present disclosure is non-uniform.

Referring to FIGS. 1A and 1B, the grid 20 defining spacing between fuel assembly compartments includes a plurality of first compartments 24 having a first cross-sectional configuration and a plurality of second compartments 28 having a second cross-section configuration different from the first cross-sectional configuration. Although shown as including a plurality of second compartments 28 having a second cross-sectional configuration different from the first cross-sectional configuration, embodiments including only one second compartment 28 a second cross-sectional configuration different from the first cross-sectional configuration are within the scope of the present disclosure.

In the illustrated embodiment of FIGS. 1A and 1B, the grid 20 includes five arrays of 3×3 cross-sectional squares of first compartments 24 and four cross-sectional squares of second compartments 28. The second compartments 28 each have a cross-sectional area equal to an array of four 2×2 cross-sectional squares of first compartments 24. Because the sizes are equivalent, a second compartment 28 can simply be exchanged during manufacturing for a 2×2 cross-sectional square of first compartments 24.

In the illustrated embodiment, the cross-sectional shapes of both the first and second compartments 24 and 28 are square in shape, with the cross-sectional shape of the second compartments 28 being larger squares than the cross-sectional shape of the first compartments 24. In other embodiments of the present disclosure, the cross-sectional shapes of the first and second compartments 24 and 28 need not be square and may be other shapes, such as rectangular, circular, oval, or, polygonal. As a non-limiting example, basket assemblies for water-water energetic reactors (VVERs) provide a grid for hexahedral fuel assemblies. Moreover, in other embodiments, the cross-sectional shapes of the first and second compartments 24 and 28 need not be the same, and may be different from one another.

In the illustrated embodiment, the grid 20 of the first and second compartments 24 and 28 is symmetrical along both a central horizontal axis and a central vertical axis. In other embodiments of the present disclosure, symmetry of compartments along one or more axes is not required. For example, the grid 20 may be symmetrical or even random in its configuration.

In the illustrated embodiment, cross-sectional area of the second compartment 28 is larger than the cross-sectional area of the first compartment 24 by a multiplication factor (e.g., 1.5×, 2×, 4×, or 8×). However, other sizes of compartments are within the scope of the present disclosure. For example, the basket assembly designs provided in FIGS. 1A and 1B may be based, for example, on boiling water reactor (BWR) fuel assemblies having smaller compartments arranged in 3×3 arrays as a result of the smaller size of BWR fuel assemblies. Larger pressurized water reactor (PWR) fuel assemblies may be arranged in larger compartments arranged in 2×2 arrays.

Referring now to FIGS. 2A, 2B, 3A, and 3B, different configurations are provided for the modular basket assembly 10.

Figure 2A:
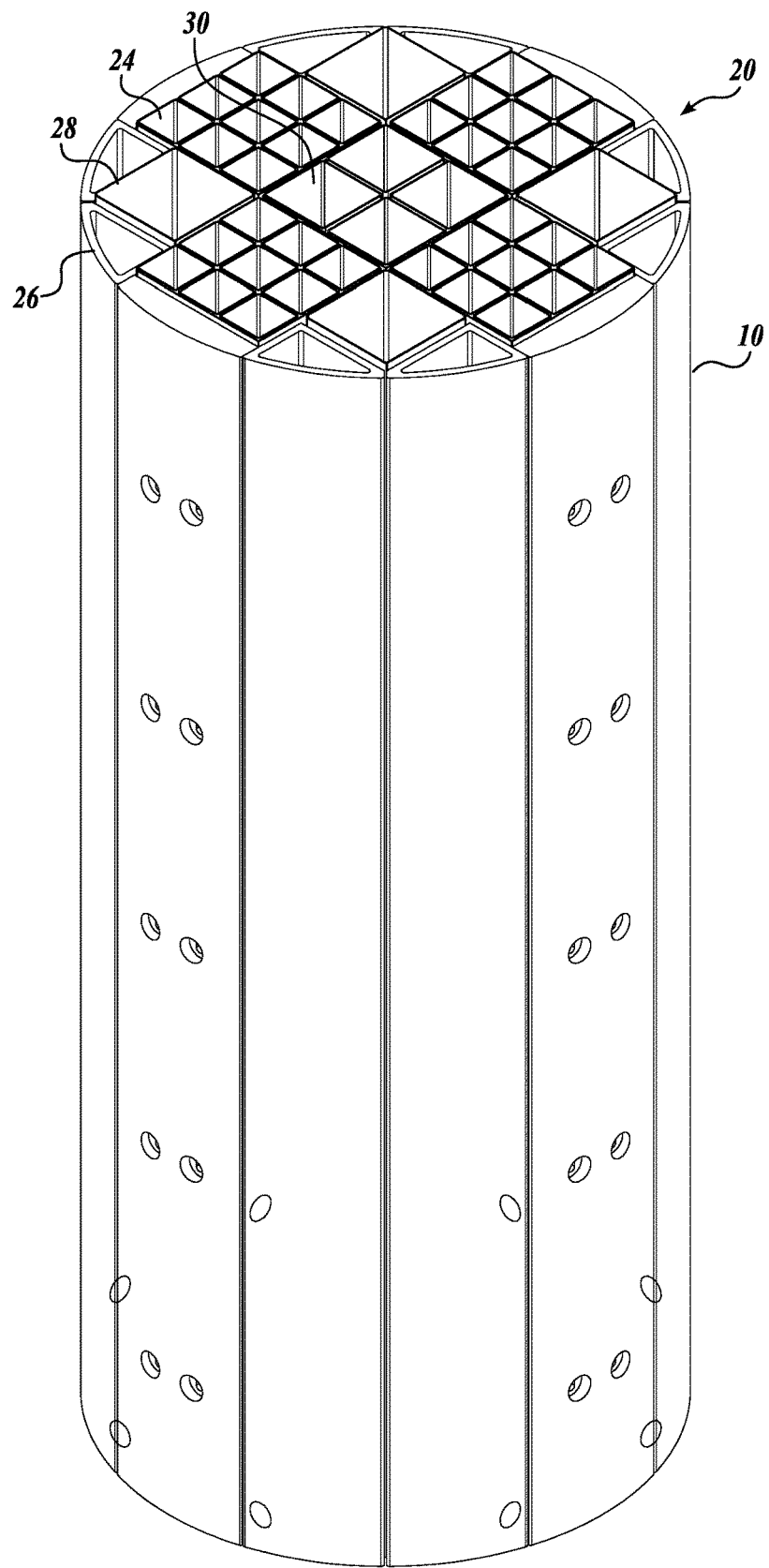
FIG. 2A is an isometric view of a basket assembly in accordance with another embodiment of the present disclosure.
Figure 2B:
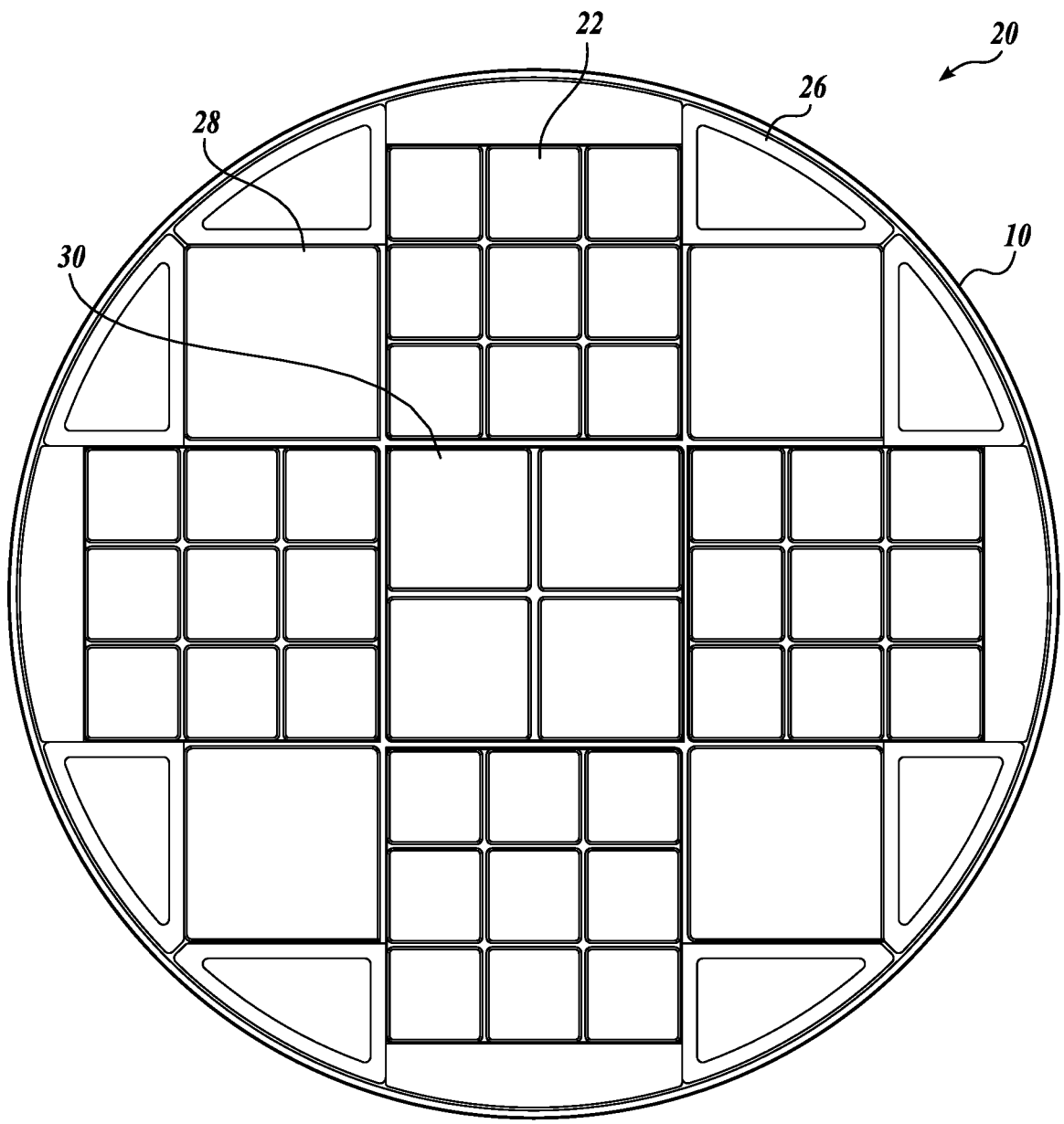
FIG. 2B is a top view of the basket assembly of FIG. 2A.

Referring to FIGS. 2A and 2B, the grid 20 defining spacing between fuel assembly compartments includes a plurality of first compartments 24 having a first cross-sectional configuration and a plurality of second compartments 28 having a second cross-section configuration different from the first cross-sectional configuration, and a plurality of third compartments 24 having a third cross-sectional configuration different from the first and second cross-sectional configurations.

In the illustrated embodiment of FIGS. 2A and 2B, the grid 20 includes four arrays of 3×3 cross-sectional squares of first compartments 24, four cross-sectional squares of second compartments 28, and four cross-sectional squares of third compartments 30. As discussed above, the second compartments 28 each have a cross-sectional area equal to an array of four 2×2 cross-sectional squares of first compartments 24. The four third compartments 30 have a cross-sectional area equal to an array of a 3×3 cross-sectional square of first compartments 24. A 2×2 array of second compartments 30 can simply be exchanged during manufacturing for a 3×3 cross-sectional square of first compartments 24.

Figure 3A:
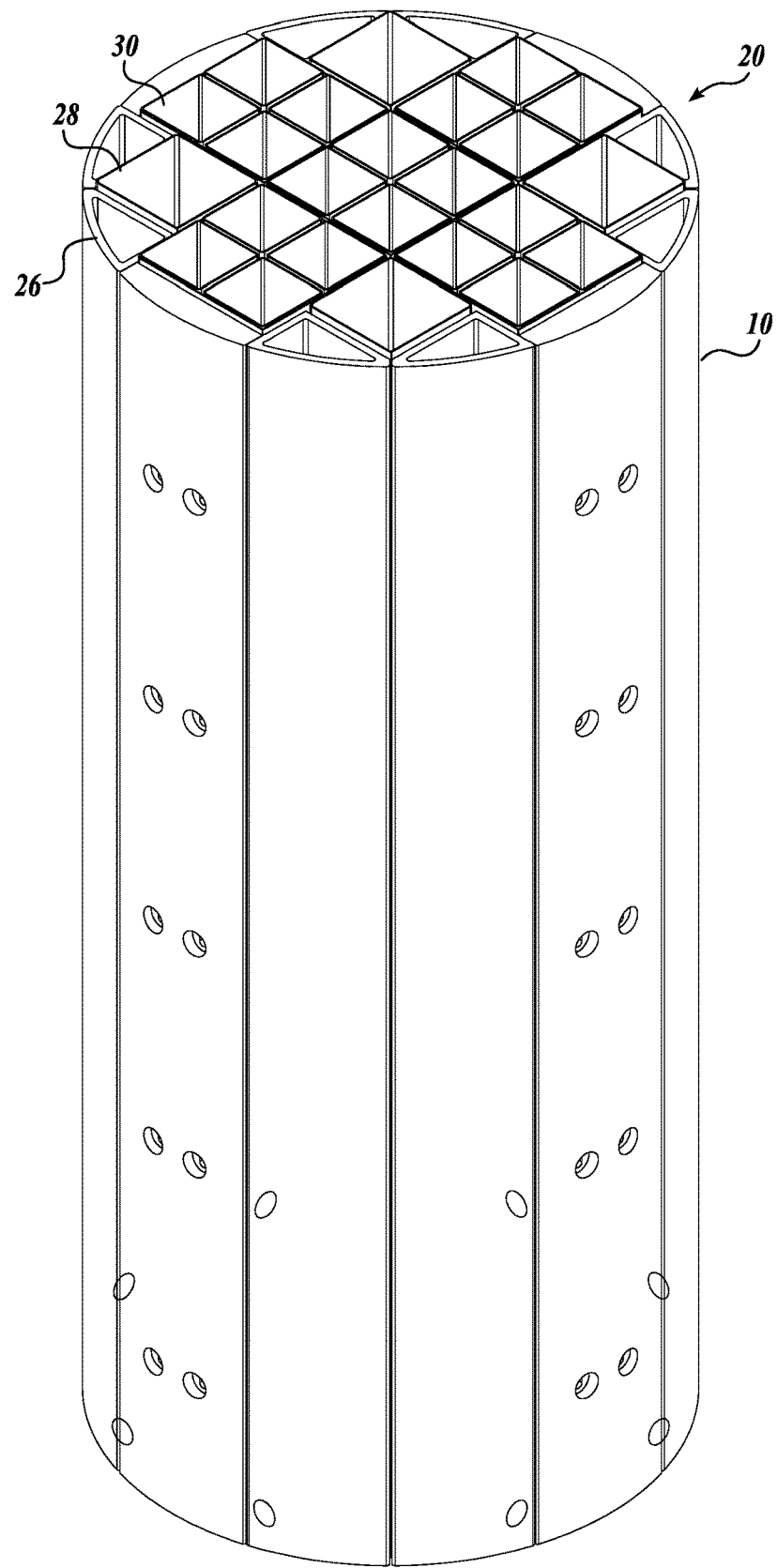
FIG. 3A is an isometric view of a basket assembly in accordance with another embodiment of the present disclosure.
Figure 3B:
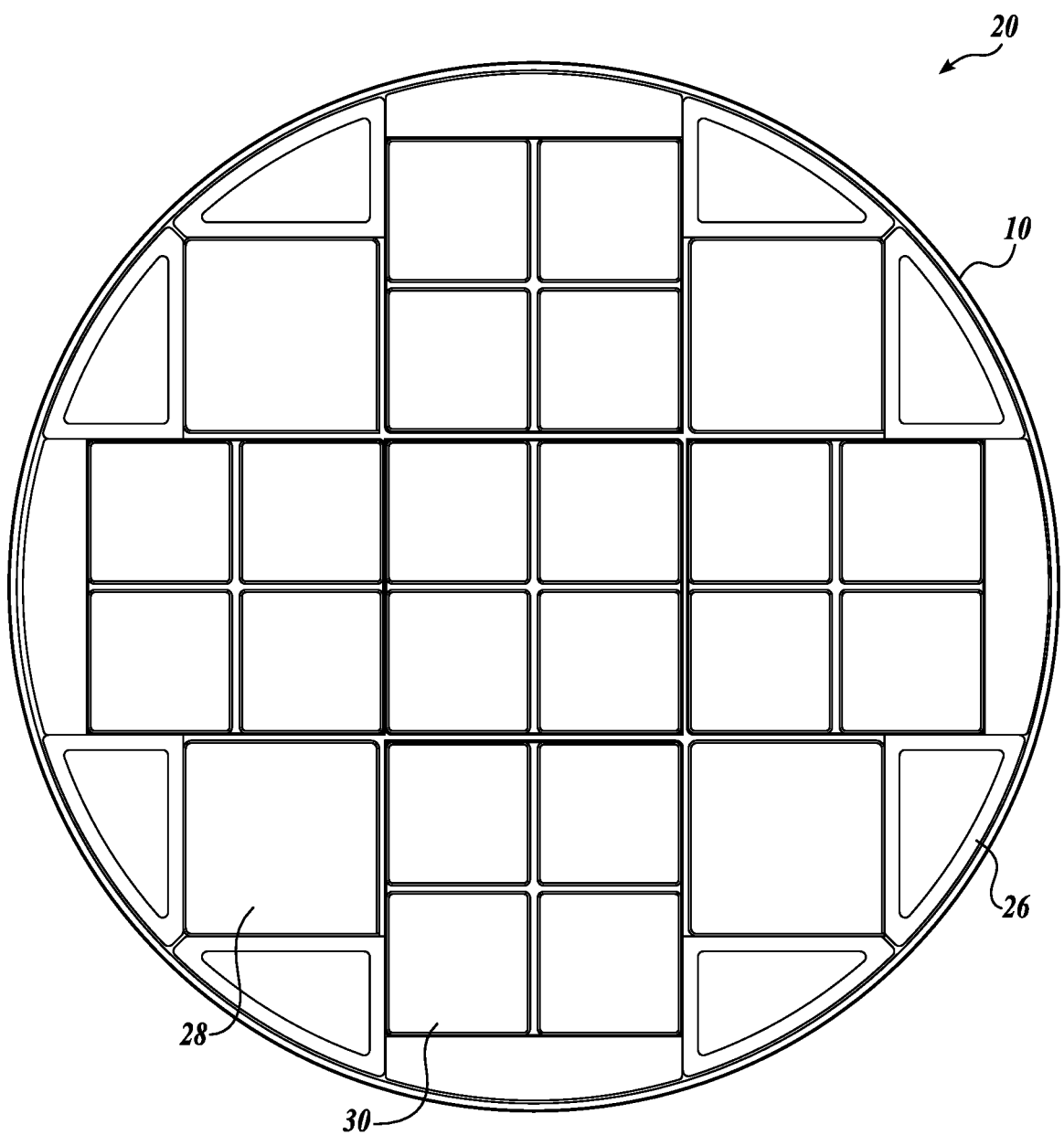
FIG. 3B is a top view of the basket assembly of FIG. 3A.

Referring to FIGS. 3A and 3B, the grid 20 defining spacing between fuel assembly compartments includes a plurality of second compartments 28 having a second cross-section configuration different from the first cross-sectional configuration and a plurality of third compartments 24 having a third cross-sectional configuration different from the second cross-sectional configuration.

In the illustrated embodiment of FIGS. 3A and 3B, the grid 20 includes five arrays of 2×2 cross-sectional squares of third compartments 30 and four cross-sectional squares of second compartments 28. The second compartments 28 each have a cross-sectional area equal to an array of four 2×2 cross-sectional squares of first compartments 24. As discussed above, a 2×2 array of second compartments 28 can simply be exchanged during manufacturing for a 3×3 cross-sectional square of first compartments 24.

Previously designed basket assemblies having uniform fuel assembly compartments are not able to handle irregular fuel assemblies that did not fit within the uniform compartments. Therefore, special baskets had to be manufactured to accommodate the irregular fuel assemblies at the disadvantages of manufacturing expense and complexing. Therefore, the advantages of the modular basket assembly 10 of the present disclosure include reduced manufacturing costs, reduced manufacturing complexity, and improved performance. When the basket manufacturer is notified of the number of irregular fuel assemblies and the cross-sectional dimensions of the irregular fuel assemblies to be disposed in the basket assembly, the basket assembly can be manufactured with specific modular cells that are larger in cross-sectional dimensions than the conventional basket cells to accommodate the irregular fuel assemblies.

While illustrative embodiments have been illustrated and described, it will be appreciated that various changes can be made therein without departing from the spirit and scope of the disclosure.

The embodiments of the disclosure in which an exclusive property or privilege is claimed are defined as follows:

1. A basket assembly for receiving a plurality of fuel assemblies and configured to accommodate an irregular fuel assembly, comprising:

a basket having a grid comprising a neutron absorbing material and defining spacing between fuel assembly compartments, the grid defining a first compartment for receiving a first fuel assembly and a second compartment for receiving a second fuel assembly, wherein the cross-sectional area of the second compartment is larger than the cross-sectional area of the first compartment, the basket assembly configured to receive in the first compartment a first fuel assembly, the first fuel assembly being a regular fuel assembly, and the basket assembly configured to receive in the second compartment the second fuel assembly, the second fuel assembly being the irregular fuel assembly that requires a relatively larger cross-sectional dimension than a cross-sectional dimension of the regular fuel assembly, wherein the irregular fuel assembly includes at least one irregular fuel rod.

2. The basket assembly of claim 1, wherein the irregular fuel rod is selected from the group consisting of a bowed fuel rod, a twisted fuel rod, a deformed fuel rod, a damaged fuel rod, bottled fuel debris, and any combinations thereof.

3. The basket assembly of claim 1, wherein the cross-sectional area of the second compartment is larger than the first compartment by a multiple of the dimensions of the first compartment.

4. The basket assembly of claim 1, wherein the second compartment has the same cross-sectional shape as the first compartment.

5. The basket assembly of claim 1, wherein the grid defines a plurality of first compartments.

6. The basket assembly of claim 1, wherein the grid defines a plurality of second compartments.

7. The basket assembly of claim 1, wherein the cross-sectional area of the second compartment is equal to an array of cross-sectional areas of the first compartments.

8. The basket assembly of claim 1, wherein the cross-sectional shape of the first compartment is square.

9. The basket assembly of claim 1, wherein the cross-sectional shape of the second compartment is square.

10. The basket assembly of claim 1, wherein the first and second fuel assemblies are spent fuel assemblies.

11. The basket assembly of claim 1, further comprising a third compartment for receiving a third fuel assembly, wherein the cross-sectional area of the third compartment is larger than the cross-sectional areas of the first and second compartments.

12. The basket assembly of claim 11, wherein the cross-sectional area of the second compartment is larger than the first compartment by a multiple of the dimensions of the first compartment.

13. The basket assembly of claim 11, wherein the third compartment has the same cross-sectional shape as the first and second compartments.

14. The basket assembly of claim 11, wherein the cross-sectional shape of the third compartment is square.

15. The basket assembly of claim 11, wherein the grid defines a plurality of third compartments.

16. A basket assembly for receiving a plurality of fuel assemblies and configured to accommodate an irregular fuel assembly, comprising:
a basket having a grid comprising a neutron absorbing material and defining spacing between fuel assembly compartments, the grid defining at least a first compartment configured for receiving a first fuel assembly, wherein the first fuel assembly is a regular fuel assembly, and a second compartment configured for receiving a second fuel assembly comprising a plurality of fuel rods including at least one irregular fuel rod, wherein the second fuel assembly is the irregular fuel assembly that requires a relatively larger cross-sectional dimension than a cross-sectional dimension of the regular fuel assembly, and wherein the cross-sectional area of the second compartment is larger than the cross-sectional area of the first compartment by a multiplication factor.

17. A basket assembly including a plurality of fuel assemblies and configured to accommodate an irregular fuel assembly, comprising:
a basket having a grid comprising a neutron absorbing material and defining spacing between fuel assembly compartments, the grid defining at least a first compartment and a second compartment, wherein the cross-sectional area of the second compartment is larger than the cross-sectional area of the first compartment; and
a regular fuel assembly disposed in the first compartment and the irregular fuel assembly comprising a plurality of fuel rods including at least one irregular fuel rod disposed in the second compartment,
wherein the irregular fuel assembly requires a relatively larger cross-sectional dimension than a cross-sectional dimension of the regular fuel assembly.

* * * * *